(12) United States Patent
Cordioli

(10) Patent No.: US 9,428,294 B2
(45) Date of Patent: Aug. 30, 2016

(54) CAROUSEL LABELING MACHINE

(71) Applicant: P.E. LABELLERS S.p.A., Porto Mantovano (IT)

(72) Inventor: Andrea Cordioli, Roverbella (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 0 days.

(21) Appl. No.: 14/383,085

(22) PCT Filed: Oct. 24, 2012

(86) PCT No.: PCT/EP2012/071061
§ 371 (c)(1),
(2) Date: Sep. 4, 2014

(87) PCT Pub. No.: WO2013/131587
PCT Pub. Date: Sep. 12, 2013

(65) Prior Publication Data
US 2015/0020978 A1  Jan. 22, 2015

(30) Foreign Application Priority Data
Mar. 7, 2012 (IT) .............................. VR2012A0038

(51) Int. Cl.
*B65C 9/08* (2006.01)
*B65C 9/00* (2006.01)
*B65C 9/04* (2006.01)
*F16M 3/00* (2006.01)

(52) U.S. Cl.
CPC . *B65C 9/08* (2013.01); *B65C 9/00* (2013.01); *B65C 9/0062* (2013.01); *B65C 9/04* (2013.01); *F16M 3/00* (2013.01); *Y10T 156/17* (2015.01)

(58) Field of Classification Search
CPC ........... Y10T 156/1771; Y10T 156/17; B65C 9/0062; F16M 3/00
USPC .......................................... 156/567; 248/646
See application file for complete search history.

(56) References Cited

U.S. PATENT DOCUMENTS 4,362,594 A * 12/1982 Nagano et al. ................ 156/567
2004/0099379 A1 * 5/2004 Erich ............................ 156/567
(Continued)

FOREIGN PATENT DOCUMENTS

DE  2005/153427 A1  7/2005
WO  WO 2011/027372 A1  3/2011

OTHER PUBLICATIONS

Notification of Transmittal (PCT/ISA/220) of the International Search Report (PCT/ISA/210) and the Written Opinion of the International Searching Authority (PCT/ISA/237) for PCT/EP2012/071061 dated Nov. 14, 2012.
(Continued)

*Primary Examiner* — Philip Tucker
*Assistant Examiner* — John Blades
(74) *Attorney, Agent, or Firm* — Koppel, Patrick, Heybl & Philpott

(57) ABSTRACT

A carousel labeling machine, comprising a plurality of peripheral seats which are each adapted to accommodate a supporting carriage of a labeling station provided with wheels, each seat being supported integrally by the structure of the carousel and comprising elements adapted to lock a carriage in such a position as to ensure the correct application of the labels to the containers that are present on the carousel by the labeling station mounted on the carriage.

7 Claims, 4 Drawing Sheets

(56) References Cited

U.S. PATENT DOCUMENTS

| | | | |
|---|---|---|---|
| 2005/0034423 A1* | 2/2005 | Sindermann et al. | 53/136.1 |
| 2005/0153427 A1 | 7/2005 | Eder et al. | |
| 2006/0150578 A1* | 7/2006 | Zwilling | 53/67 |
| 2007/0193223 A1* | 8/2007 | Schach et al. | 53/167 |
| 2007/0204563 A1* | 9/2007 | Kramer et al. | 53/167 |
| 2008/0156442 A1* | 7/2008 | Meinzinger | 156/351 |
| 2009/0301662 A1* | 12/2009 | Ferri et al. | 156/538 |
| 2013/0192766 A1* | 8/2013 | Erhart et al. | 156/556 |
| 2013/0319596 A1* | 12/2013 | Cattabriga | 156/60 |

OTHER PUBLICATIONS

Search Report for IT VR20120038 and written opinion dated Nov. 6, 2012.

* cited by examiner

CAROUSEL LABELING MACHINE

The present invention relates to a carousel labeling machine.

It is known that there are carousel labeling machines in which the labeling stations are supported by respective carriages provided with wheels that are moved closer to the machine at adapted seats and are locked therein. In this manner it is possible to provide a machine with a plurality of labeling stations, designed for example to apply multiple differently arranged labels on each one of the containers that are present on the carousel, but it also possible to provide a same machine with different labeling stations, such as for example stations provided with pre-adhesive labels or with adhesive bonding devices with hot- or cold-setting glue, thus providing a considerable cost saving.

The system for locking a carriage to the corresponding seat has various embodiments, and for example one very simple solution has been protected by this same Applicant with PCT/EP2011/069446.

However improvements are needed and thus the aim of the present invention is to provide an improved carousel labeling machine.

This aim is achieved by a machine as defined in the appended claims.

Further characteristics and advantages of the invention will become better apparent from the description of a preferred but not exclusive embodiment of the invention, illustrated by way of non-limiting example in the accompanying drawings, wherein.

Figure 1:
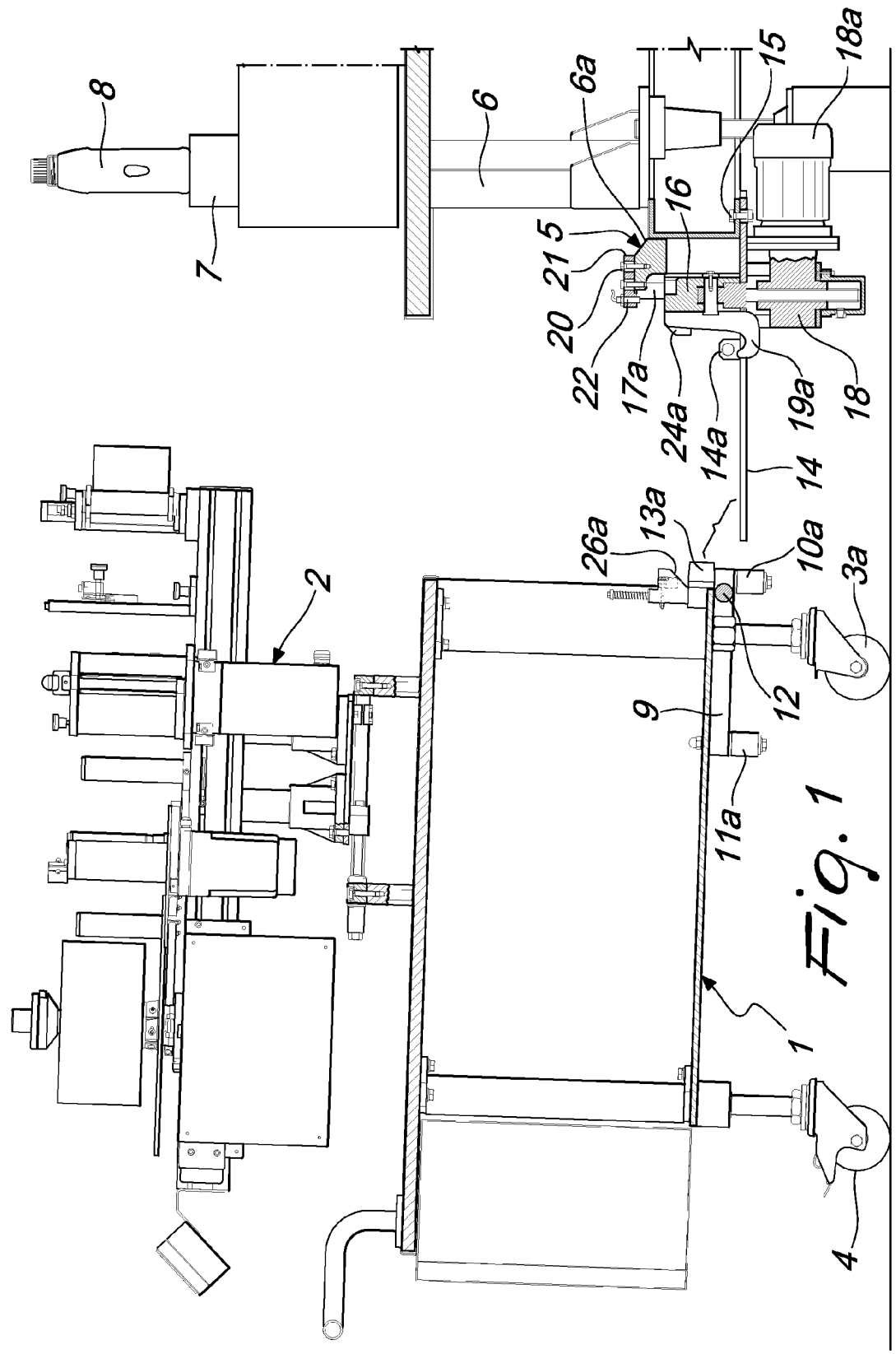
FIG. 1 is a side view of a supporting carriage of a labeling station moving toward the corresponding seat provided on a labeling machine.

With reference to the figures, the supporting carriage of the labeling station 2, which is per se known, is generally designated by the reference numeral 1 and is provided with four wheels, and precisely two front wheels 3a, 3b and two rear wheels such as 4, that allow its approach, for subsequent locking in the manners that will be illustrated, to a seat generally designated by the reference numeral 5 that is located, with other identical seats, at the peripheral region of a structure 6 of the carousel or carousel labeling machine, of which FIG. 1 shows a plate 7 for supporting a container 8 to be labeled.

The seat 5 is supported completely by the structure 6 of the machine and comprises means such as to ensure, by operating together with means present on the carriage, the locking of the carriage in such a position as to allow the correct application of the labels on the containers by the station 2.

Advantageously, the seats 5 are provided with locking means adapted to provide the condition by way of which, as will be better explained hereinafter, the carriages 1 will be locked in each seat 5 in an identical position with respect to the carousel, so as to ensure the possibility of interchanging the carriages 1 among the various seats 5.

These means, therefore, are described starting from the ones present on the carriage 1, which comprises a frame 9 to which a front pair of cylindrical tabs 10a, 10b and a rear pair of similar tabs 11a, 11b are fixed which are mutually aligned transversely, the tabs 11a, 11b of the rear pair being then aligned longitudinally with the tabs 10a, 10b respectively of the front pair.

Two coaxial wheels such as 12 are also fixed externally to the frame 9 coaxially along an axis which is transverse to the carriage 1, and two bumpers 13a, 13b made of elastic material, designed to make contact with the front of the seat 5 that faces them, are also conveniently provided.

The seat 5 comprises a plate 14, which is substantially horizontal and shaped appropriately so as to penetrate between the cylindrical tabs 10a, 10b, and 11a, 11b respectively of the front pair and of the rear pair present on the carriage 1, so as to ensure that the carriage has the correct radial position with respect to the carousel when it is pushed by an operator.

The plate 14 is provided conveniently with an articulation 14a that has an axis which is parallel to the surface of the plate, for the reduction of the volume when it is not active, and is fixed advantageously to the structure 6 of the machine by means of screws 15 which are associated with slots 15a provided in the plate, so as to be able to adjust its position in a radial direction with respect to the carousel.

A slider 16 is provided on the plate 14 and has means for movement along guides 17a, 17b in a direction at right angles to the plate which comprise advantageously a jack 18 moved by an electric motor 18a.

The slider 16 supports two hooks 19a, 19b, which are adapted to make contact respectively with the wheel 12 and with the corresponding wheel provided in the region not shown in the figures, so as to cause the lifting of the carriage at the front wheels 3a, 3b, as will be described better hereinafter.

Before starting the operation of the labeling machine, one proceeds once and for all to make some adjustments on the individual seats 5 comprised in the machine, which have the purpose of ensuring that all the sliders 16 of the various stations with the hooks 19a, 19b are at the same radial distance from the center of the machine and that the upward stroke of all the sliders 16 is such as to bring to a same level the wheels 12 of the various carriages. The choice of the carriage that will be associated with a given seat thus becomes equal, with the possibility of interchanging carriages among the various seats.

Now, in order to ensure that the sliders 16 of all the seats 5 are at the same distance from the center of the machine, one acts on the screws 15 described previously and on screws 20 associated with blocks 21 which are integral with each slider in order to fix them to tabs 6a of the structure of the machine, by utilizing the presence of the slots 15a, 20a to move the plates 14 that indeed support the sliders.

In order to then obtain the condition in which in all the seats 5 the corresponding hooks 19a, 19b bring the wheels such as 12 to a same level, it will be sufficient to act on proximity sensors 22 of each seat, supported in an adjustable position by the blocks 21.

Operation of the invention is as follows.

Figure 2:
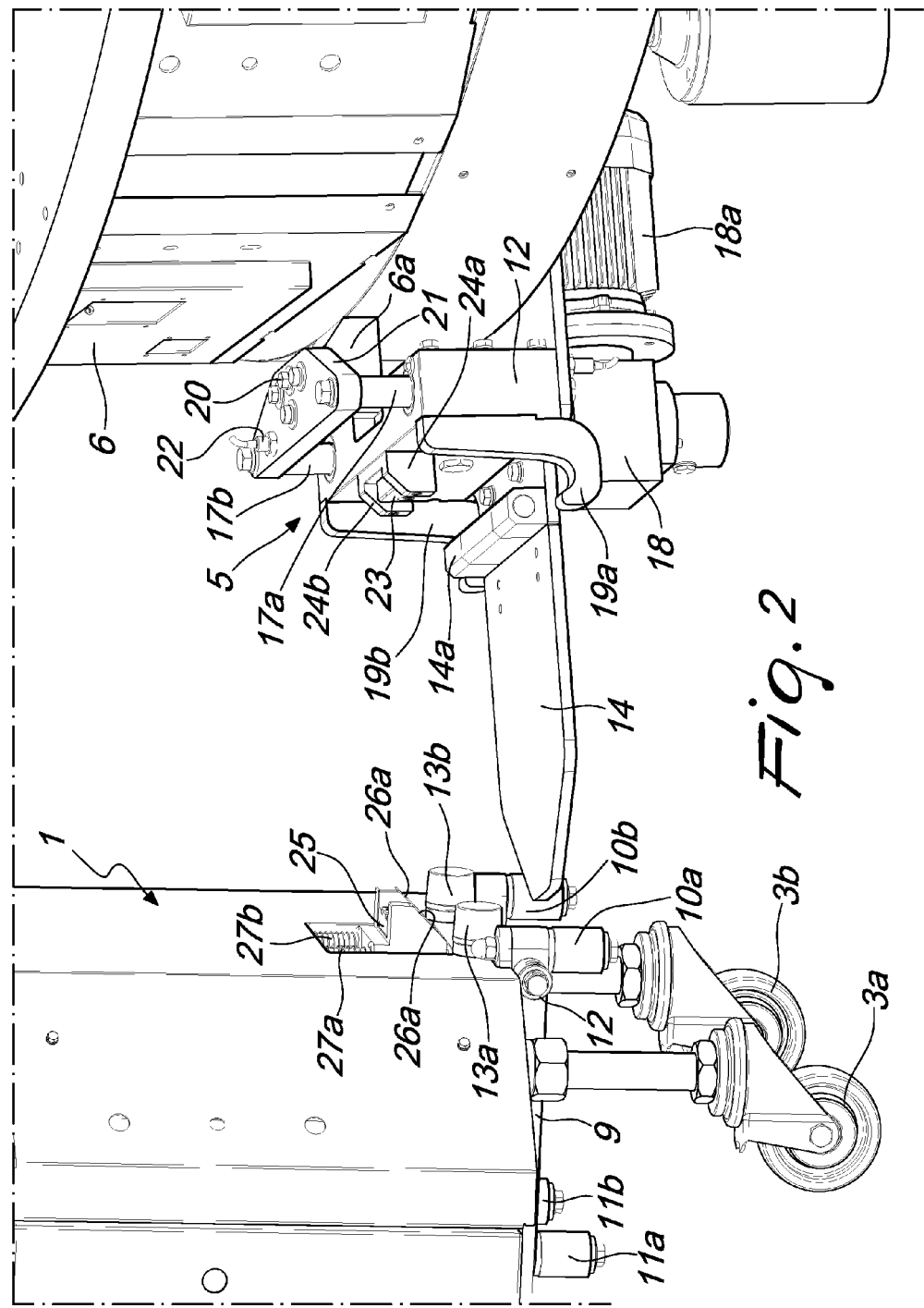
FIG. 2 is a view of a detail of FIG. 1.
Figure 3:
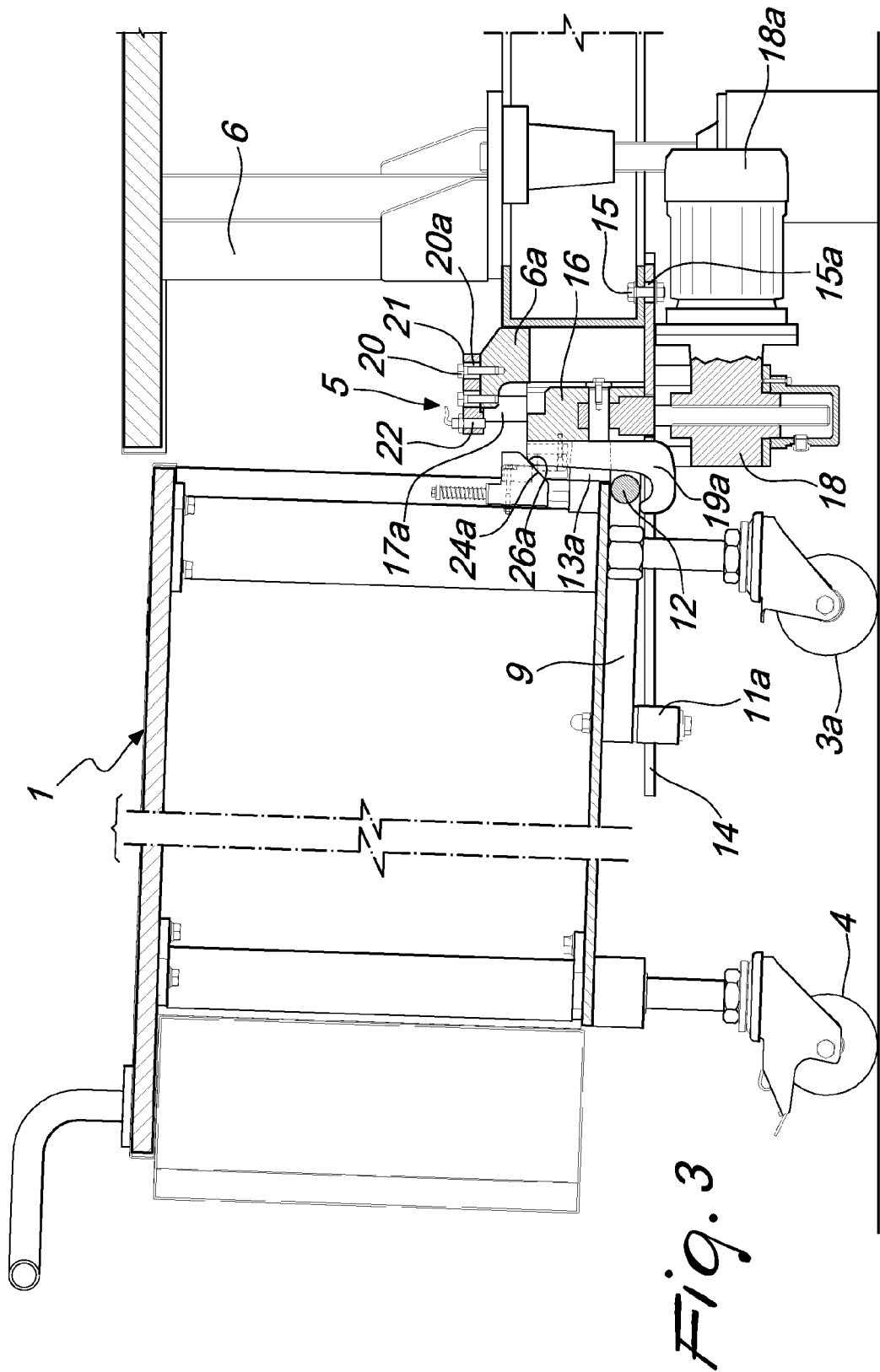
FIG. 3 is a view of the situation when the carriage has made final contact with the corresponding seat, but is not locked yet.
Figure 4:
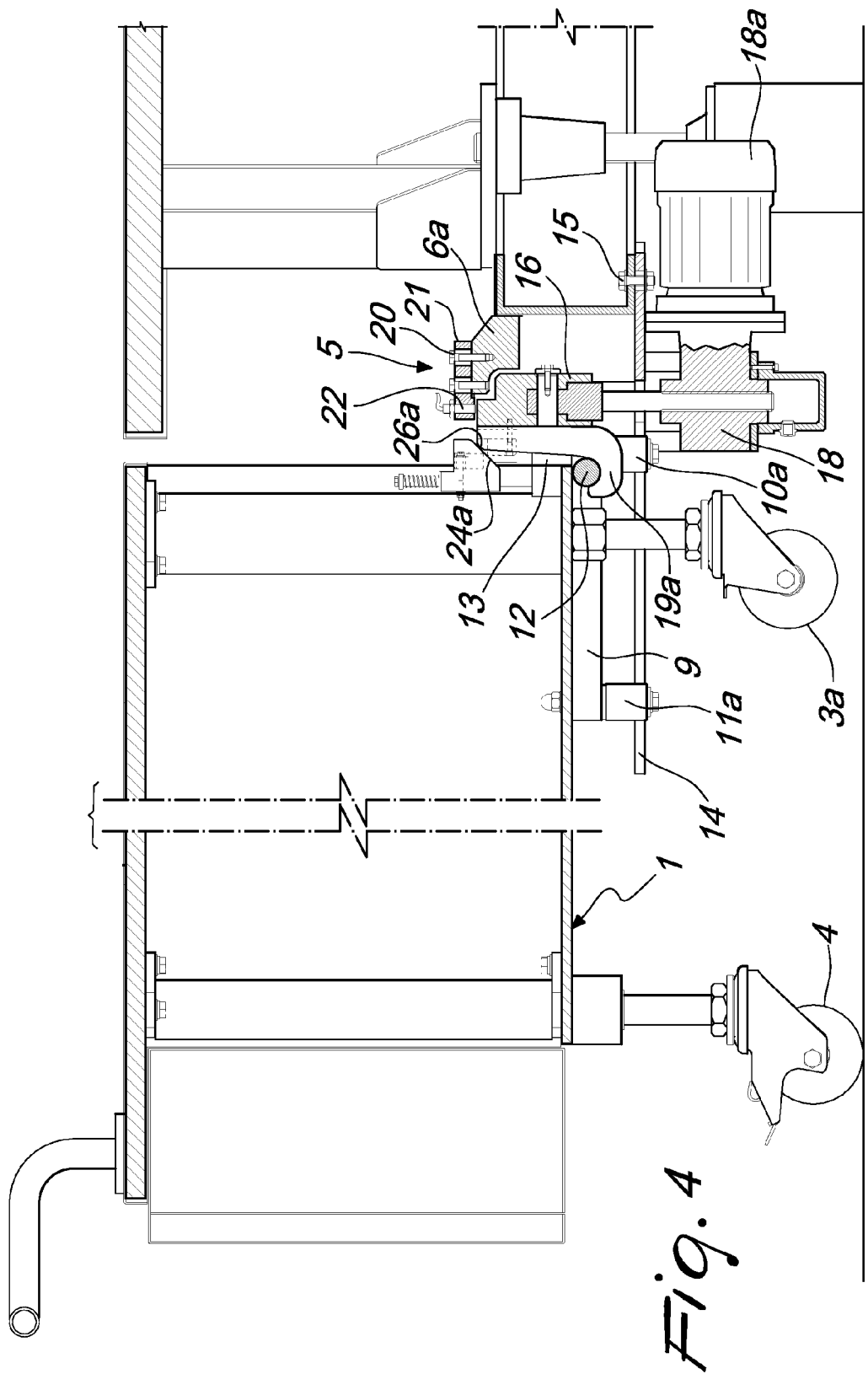
FIG. 4 is a view of the carriage locked with respect to the seat, in the situation in which the corresponding labeling station is ready to operate.

The operator pushes the carriage 1 from the position of FIGS. 1 and 2 toward the position of FIG. 3, guided by the penetration of the plate 14 between the cylindrical tabs 10a, 10b and 11a, 11b, and the carriage stops when the bumpers 13a, 13b make contact with the front of the slider 16.

In the position of FIG. 3, the wheels 12 are ready to be taken by the hooks 19a, 19b, which operate thanks to the action of the jack 18, which lifts the slider 16 to the level set by the proximity sensor 22.

Consequently, the front wheels 3a, 3b of the carriage 1 are lifted from the floor, the carriage 1 is locked in the correct position by the contact of the wheels 12 with the hooks 19a, 19b, and therefore everything is ready for operation.

The machine is also provided with a safety device. It comprises a first magnet 23, which is accommodated in a first block that comprises two first inclined planes 24a, 24b and is jointly connected to the slider 16, and a second magnet 25, which is accommodated in a second block that has two second inclined planes 26a, 26b which are complementary to the planes 24a, 24b, the second block being arranged so as to protrude from the front of the carriage and be able to slide in a vertical direction and held in the lower end position by the action of springs 27a, 27b.

When the carriage moves forward, the second magnet 25 moves, due to the action of the described inclined planes, so that it faces the first magnet 23 in the position of FIG. 3, and reaching this condition has the effect of giving clearance for the operation of all the elements of the machine.

The invention thus conceived is susceptible of numerous modifications and variations, all of which are within the scope of the appended claims. All the details may further be replaced with other technically equivalent elements.

The disclosures in Italian Patent Application No. VR2012A000038 from which this application claims priority are incorporated herein by reference.

The invention claimed is:

1. A labeling machine, comprising a carousel comprising a plurality of peripheral seats each of which are adapted to accommodate a supporting carriage of a labeling station provided with front and rear wheels for resting on the floor and for allowing said supporting carriage to approach said seats, each seat being supported integrally by the structure of the carousel and comprising means adapted to lock a carriage in such a position as to ensure the correct application of labels to containers present on the carousel by the labeling station mounted on said carriage, wherein the seats are provided with locking means which are adapted such that the carriages are locked in each seat in an identical position with respect to the carousel, so as to ensure the possibility of interchange of carriages among the various seats, and with the front wheels in a lifted position with respect to the floor and the rear wheels resting on the floor, wherein:

each carriage comprises a front pair and a rear pair of cylindrical tabs which are transversely aligned, the tabs of the rear pair being aligned longitudinally with the tabs of the front pair, and further comprises two coaxial wheels which are fixed externally to the carriage along an axis which is transverse to said carriage;

and each seat comprises a substantially horizontal plate which is shaped appropriately so as to penetrate between the two cylindrical tabs which form respectively the front pair and the rear pair, so as to ensure that the carriage has a correct radial position with respect to the carousel when it is pushed by an operator, a slider being present on said plate, having means for movement at right angles to said plate and supporting two hooks, which are adapted to make contact with the two wheels which are fixed to the carriage, so as to cause the lifting thereof from a position in which all the wheels are in contact with the floor to a preset height with the front wheels raised from said floor.

2. The machine according to claim 1, wherein the means for moving the slider comprises a jack which is moved by an electric motor, wherein a proximity sensor is fixed in an adjustable position to a tab of the carousel in order to adjust a maximum preset height of the lifting of the slider.

3. The machine according to claim 1, wherein the two hooks adapted to make contact with the two wheels supported by the carriage are adapted to produce lifting to a height that is the same for all the seats.

4. The machine according to claim 1, wherein the plate is fixed to the structure of the carousel by way of screws which are associated with slots provided in said plate, so as to be able to adjust its position in a radial direction with respect to the carousel.

5. The machine according to claim 1, wherein the plate is provided with an articulation having an axis parallel to the surface of said plate.

6. The machine according to claim 1, further comprising a safety device which comprises:

a first magnet, which is accommodated in a first block which comprises two first inclined planes and is jointly connected to the slider; and a second magnet, which is accommodated in a second block which has two second inclined planes which are complementary to said first inclined planes, said second block being arranged so as to protrude from the front of the carriage that faces the seat and being able to slide in a vertical direction and being held in a neutral lower end position by the action of springs and adapted to rise in order to move the second magnet so that it faces the first magnet following contact between the first and second inclined planes when the carriage is pushed by an operator.

7. A carousel labeling machine, comprising a plurality of peripheral seats which are each adapted to accommodate a supporting carriage of a labeling station provided with front and rear wheels for resting on the floor and for allowing an approach of the carriage to said seats, each seat being supported integrally by the structure of the carousel and comprising means adapted to lock a carriage in such a position as to ensure the correct application of the labels to the containers that are present on the carousel by the labeling station mounted on said carriage, wherein:

each carriage comprises a front pair and a rear pair of cylindrical tabs which are mutually aligned transversely, the tabs of the rear pair being aligned longitudinally with the tabs of the front pair, and further comprises two coaxial wheels which are fixed externally to the structure of the carriage along an axis which is transverse to said carriage;

and each seat comprises a substantially horizontal plate which is shaped appropriately so as to penetrate between the two cylindrical tabs which form respectively the front pair and the rear pair, so as to ensure that the carriage has a correct radial position with respect to the carousel when it is pushed by an operator, a slider being present on said plate, having means for movement at right angles to said plate and supporting two hooks, which are adapted to make contact with the two wheels which are fixed to the carriage, so as to cause the lifting thereof from a position in which all the wheels are in contact with the floor to a preset height with the front wheels raised from said floor.

* * * * *